US010081434B2

(12) United States Patent
Lozano et al.

(10) Patent No.: US 10,081,434 B2
(45) Date of Patent: Sep. 25, 2018

(54) TRACK MOUNTED HOLD OPEN ROD (71) Applicant: Rohr, Inc., Chula Vista, CA (US)

(72) Inventors: Raphael Lozano, La Jolla, CA (US);
Kevin I. Strong, Chula Vista, CA (US);
Andrew Mai-Tuan Hoang, Mission Viejo, CA (US); Johann S. Schrell, San Diego, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 580 days.

(21) Appl. No.: 14/656,337

(22) Filed: Mar. 12, 2015

(65) Prior Publication Data
US 2016/0264249 A1 Sep. 15, 2016

(51) Int. Cl.
*B64D 29/06* (2006.01)
*B64D 29/08* (2006.01)

(52) U.S. Cl.
CPC .............. *B64D 29/06* (2013.01); *B64D 29/08* (2013.01)

(58) Field of Classification Search
CPC ........... B64C 1/1446; B64C 1/14; B64C 7/02; B64C 7/00; B64D 29/08; B64D 29/06
See application file for complete search history.

(56) References Cited

U.S. PATENT DOCUMENTS

| 2,701,446 | A |   | 2/1955  | Gilbert      |            |
|-----------|---|---|---------|--------------|------------|
| 2,703,431 | A | * | 3/1955  | Tatom et al. | E05C 19/145 |
|           |   |   |         |              | 16/258     |
| 3,999,502 | A |   | 12/1976 | Mayer        |            |
| 4,399,966 | A |   | 8/1983  | Crudden      |            |
| 4,585,189 | A | * | 4/1986  | Buxton       | B64D 29/00 |
|           |   |   |         |              | 244/129.4  |
| 4,629,146 | A |   | 12/1986 | Lymons       |            |
| 4,679,750 | A | * | 7/1987  | Burhans      | B64D 29/06 |
|           |   |   |         |              | 244/129.4  |
| 5,046,689 | A | * | 9/1991  | Shine        | B64D 29/08 |
|           |   |   |         |              | 244/129.4  |
| 5,267,760 | A | * | 12/1993 | Carlin       | B64D 29/06 |
|           |   |   |         |              | 292/19     |
| 5,518,206 | A | * | 5/1996  | Arnold       | B64D 29/06 |
|           |   |   |         |              | 244/129.4  |

(Continued)

FOREIGN PATENT DOCUMENTS

WO    WO 2016193641 A1 * 12/2016 ............. B64D 29/00

OTHER PUBLICATIONS

Sofia Ponce Borrero, "A340-600 Fan Cowls Finite Element Model: Using MSC.Nastran to Model CFC Secondary Structures With Contact Boundary Conditions", EADS CASA Military Transport Aircraft Division, 3rd Worldwide Aerospace Conference, Sep. 24-26, 2001.

*Primary Examiner* — Benjamin P Lee
(74) *Attorney, Agent, or Firm* — O'Shea Getz P.C.

(57) ABSTRACT

Aspects of the disclosure are directed to a system configured to selectively hold open an aircraft engine cowl, comprising: a rod, a slider coupled to the rod, a track coupled to the slider, a latch coupled to the track. Aspects of the disclosure are directed to a nacelle system of an aircraft, comprising: an engine case, a bracket attached to the engine case or a cowl, a rod coupled to the bracket via a bearing, a clevis coupled to the rod, a slider coupled to the clevis, a track coupled to the slider and to the engine case or the cowl, and a latch coupled to the track that is configured to control a translation of the slider along the track based on a state of the cowl.

10 Claims, 15 Drawing Sheets

(56) References Cited

U.S. PATENT DOCUMENTS

| | | | |
|---|---|---|---|
| 5,547,130 A | 8/1996 | Davies | |
| 6,189,832 B1* | 2/2001 | Jackson | B64C 7/02 244/129.4 |
| 6,227,485 B1* | 5/2001 | Porte | B64D 29/08 244/53 B |
| 6,334,730 B1 | 1/2002 | Porte | |
| 6,487,846 B1 | 12/2002 | Chakkera | |
| 6,622,474 B1 | 9/2003 | Sternberger | |
| 6,629,712 B2* | 10/2003 | Jackson | B64D 29/02 244/129.4 |
| 7,275,362 B2 | 10/2007 | Strunk | |
| 7,559,507 B2 | 7/2009 | Harrison | |
| 8,621,978 B2* | 1/2014 | Moradell-Casellas | B64D 29/06 92/23 |
| 8,627,644 B2* | 1/2014 | Vauchel | B64D 29/08 60/226.2 |
| 8,720,183 B2 | 5/2014 | Welch | |
| 8,956,109 B2* | 2/2015 | Regard | B64D 29/08 415/126 |
| 9,221,545 B2* | 12/2015 | Popescu | F01D 25/24 |
| 2002/0140238 A1* | 10/2002 | Jackson | B64D 29/02 292/263 |
| 2003/0102405 A1* | 6/2003 | McEvoy | B64D 29/04 244/54 |
| 2010/0024161 A1* | 2/2010 | Wood | E05C 17/30 16/82 |
| 2010/0107599 A1* | 5/2010 | Vauchel | B64D 29/08 60/226.2 |
| 2011/0038725 A1* | 2/2011 | Soulier | B64D 29/06 415/214.1 |
| 2011/0173949 A1* | 7/2011 | Provost | B64D 29/06 60/226.1 |
| 2011/0297787 A1* | 12/2011 | Guillaume | B64D 29/06 244/129.4 |
| 2012/0170227 A1* | 7/2012 | Bayliss | B64C 1/1446 361/727 |
| 2013/0259641 A1 | 10/2013 | Stewart | |
| 2014/0353533 A1 | 12/2014 | Guse | |
| 2016/0363098 A1* | 12/2016 | Kopecek | F02K 1/766 |

* cited by examiner

TRACK MOUNTED HOLD OPEN ROD

BACKGROUND

Figure 1A:
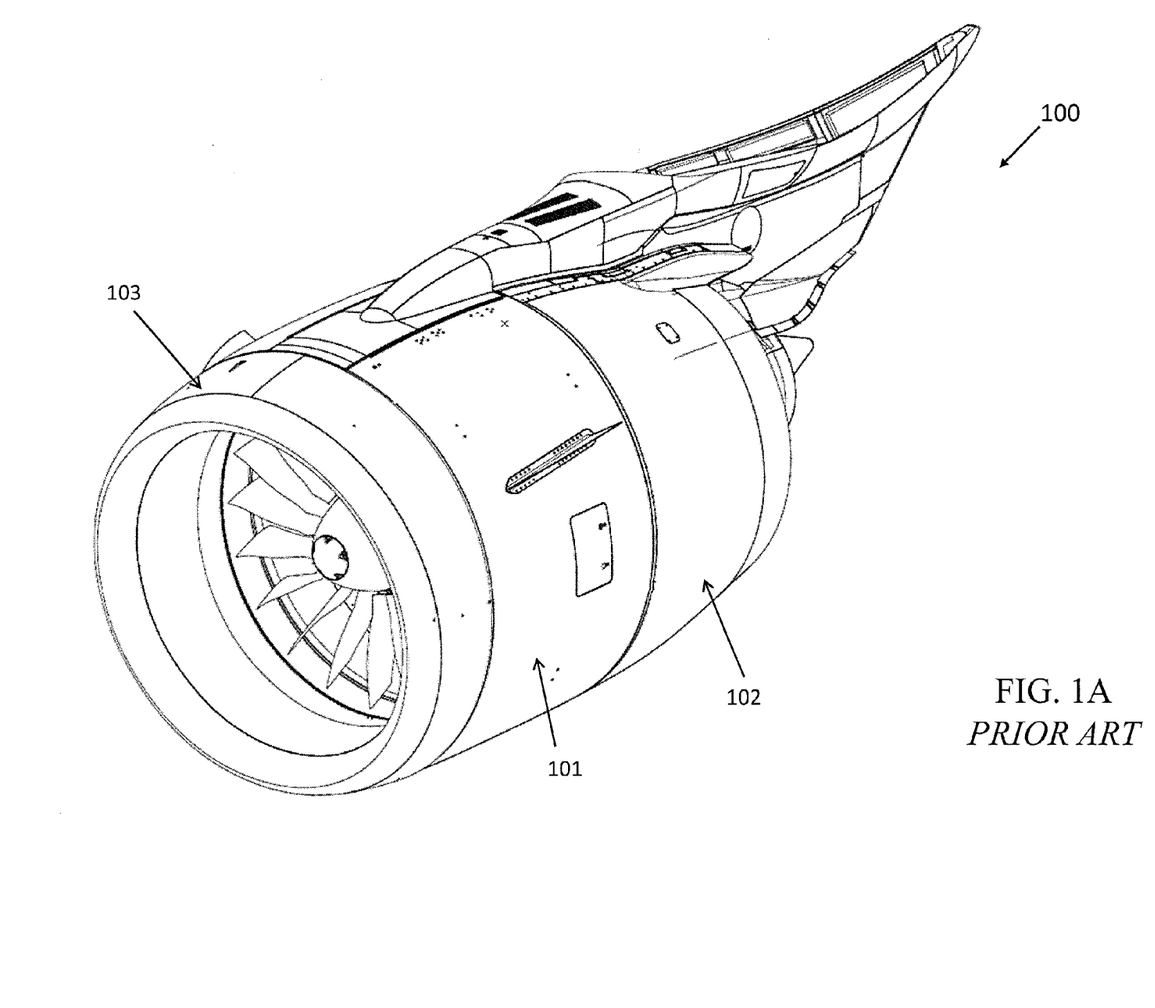
FIGS. 1A-1E illustrate components and devices associated with an aircraft nacelle in accordance with the prior art.
Figure 1B:
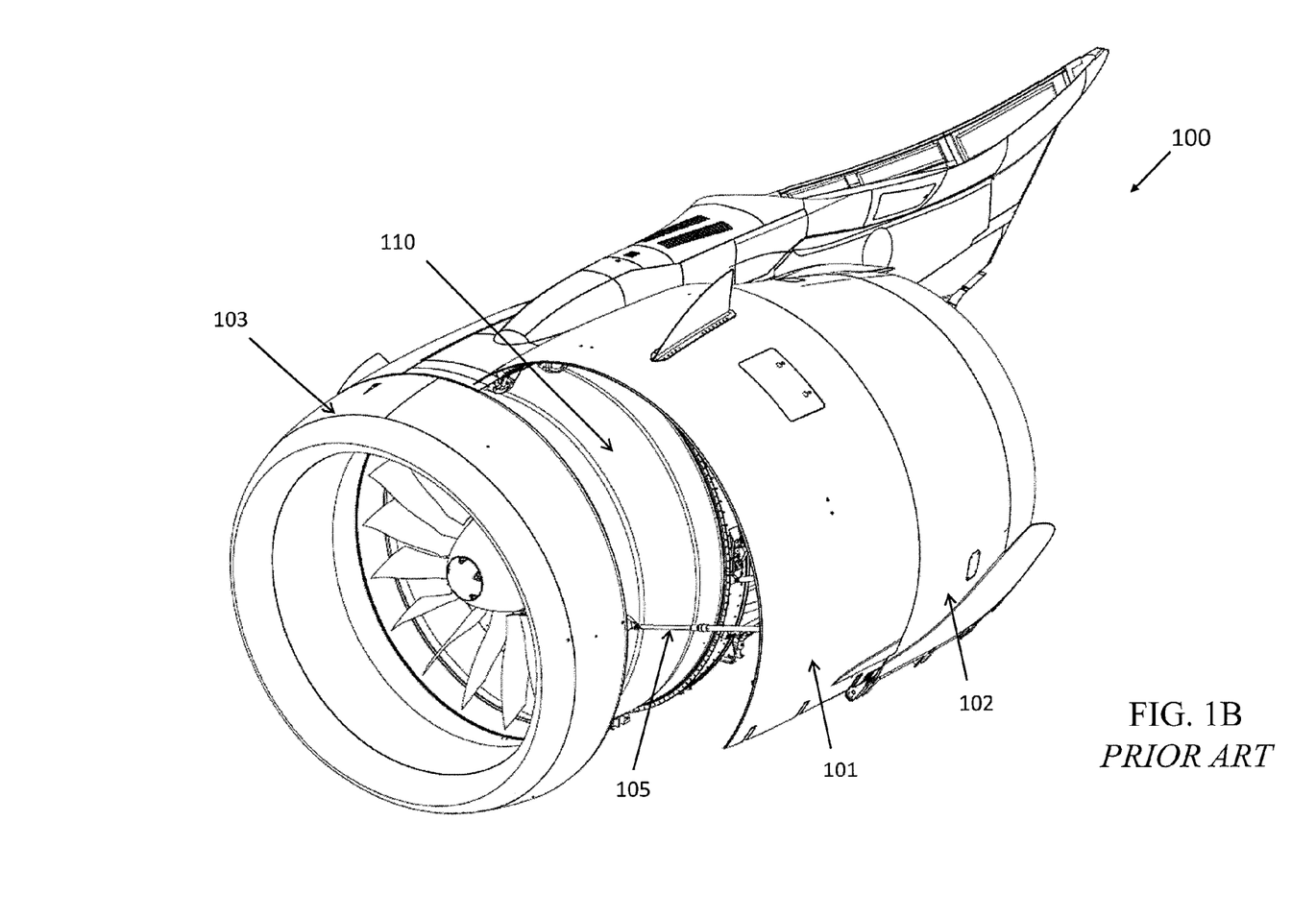
Figure 1C:
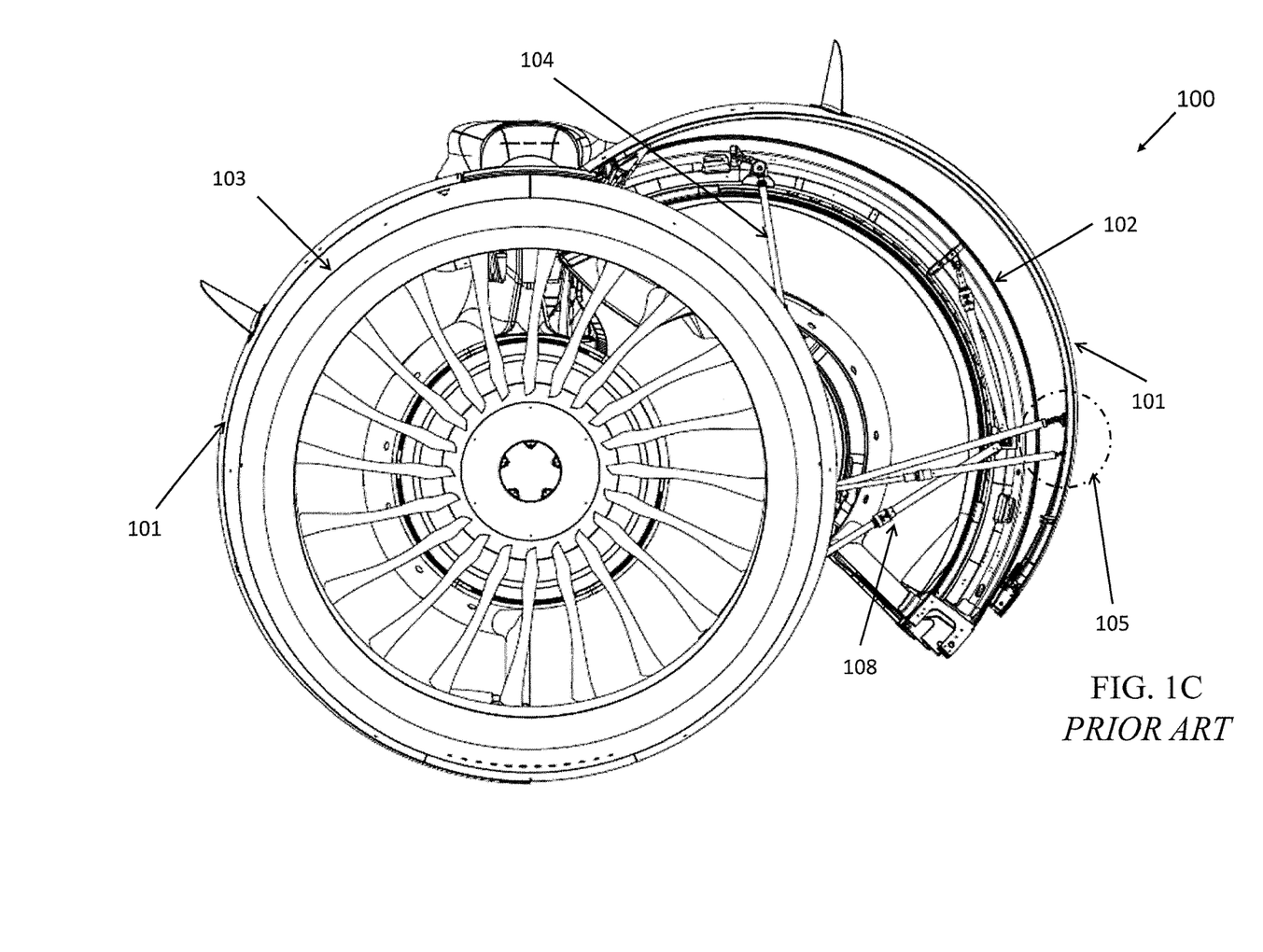
Figure 1D:
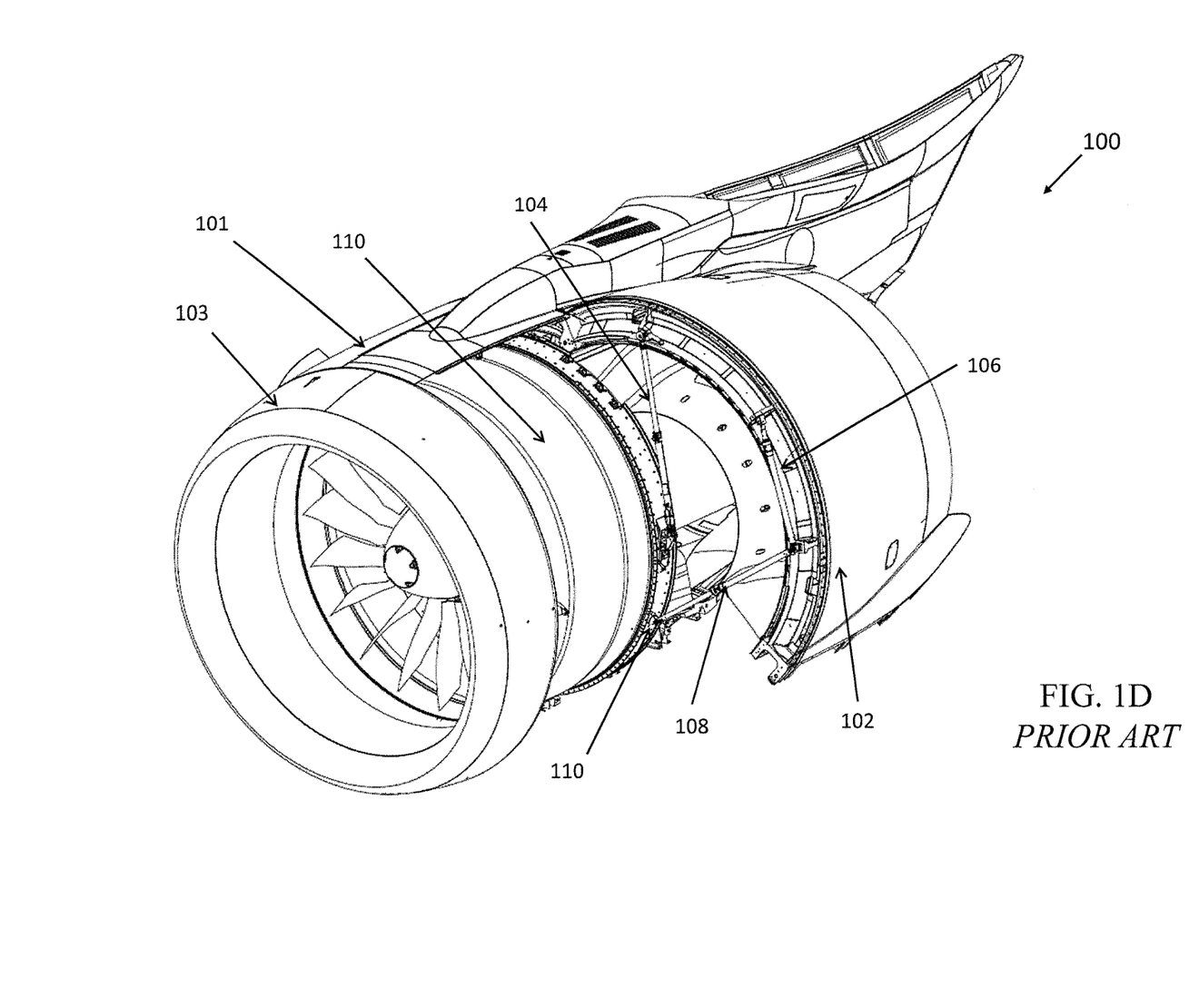
Figure 1E:
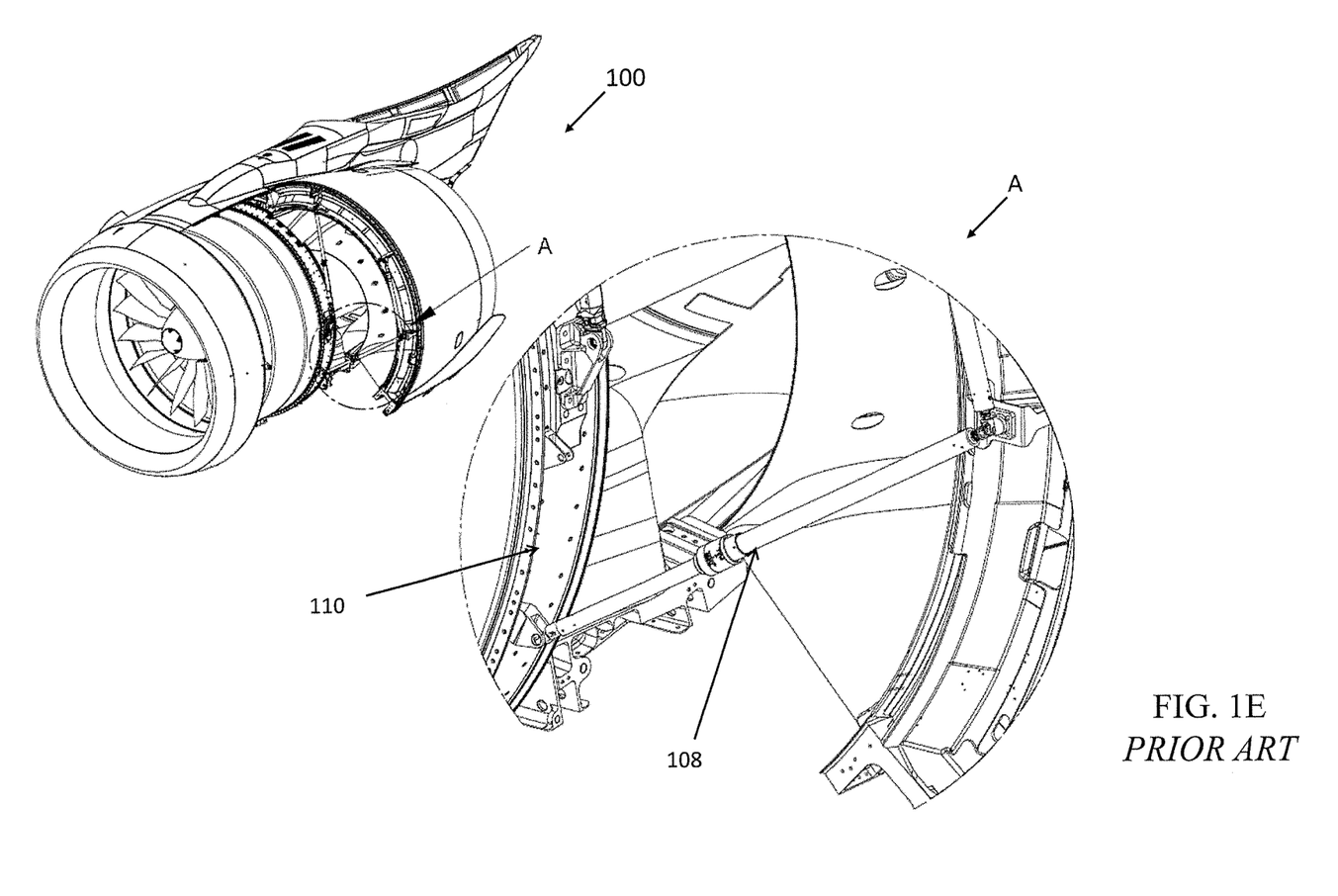

Referring to FIGS. 1A-1E, in connection with a nacelle 100 of an aircraft that is used to house an engine, a door opening system (DOS) and Hold Open Rod (HOR) system are used to provide a technician with access to the engine. Access is achieved by opening one of several cowls which make up the nacelle 100. As an example, the nacelle 100 may include a fan cowl 101, a thrust reverser 102, an inlet cowl 103, etc. To open, e.g., the thrust reverser 102, a technician: (1) activates an actuator 104 of the DOS until the thrust reverser 102 is open to its maximum angle position, (2) unstows a HOR 108 from a stowed position 106, (3) extends the HOR 108 to a deployed position, (4) attaches the HOR 108 to an engine fan case 110, and (5) lowers thrust reverser 102 to its resting angle position, thereby resting the weight of the thrust reverser 102 on the HOR 108. In FIG. 1E, the portion of the nacelle 100 denoted by circle A is shown in a blown-up view once the thrust reverser 102 has been lowered to the resting position.

To close the thrust reverser 102, the technician: (1) relieves the weight of the thrust reverser 102 off the HOR 108 when the HOR 108 is in the deployed position, (2) disengages a locking mechanism of the HOR 108 to disengage the HOR 108 before being able to collapse the HOR 108, (3) restores the HOR 108 to the stowed position 106, and (4) closes the thrust reverser 102.

The above opening and closing procedures require the technician to carry out a number of steps in a predefined order, leading to the potential for human error if the steps are executed improperly or out-of-order. Failure to carry out the steps in an appropriate manner can potentially result in an impairment of the nacelle 100.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system configured to selectively hold open an aircraft engine cowl, comprising: a rod, a slider coupled to the rod, a track coupled to the slider, a latch coupled to the track. In some embodiments, the system further comprises a locking mechanism coupled to the latch and the track. In some embodiments, the locking mechanism is configured to cause the latch to rotate in a first direction about an axis as the slider translates along the track in a first longitudinal direction when the cowl is being opened, and the locking mechanism is configured to cause the latch to rotate in a second direction about the axis that is opposite the first direction when the slider clears the latch as the slider translates along the track in the first longitudinal direction. In some embodiments, the locking mechanism comprises a solenoid. In some embodiments, the system further comprises a bracket coupled to a first end of the rod. In some embodiments, the bracket is attached to an engine case or the cowl. In some embodiments, the system further comprises a clevis coupled to a second end of the rod, and a pin coupled to the clevis and the slider. In some embodiments, a portion of the slider that contacts the track is made of polytetrafluoroethylene, and the track is made of aluminum. In some embodiments, the track includes a first section that contacts the slider.

Aspects of the disclosure are directed to a nacelle system of an aircraft, comprising: an engine case, a bracket attached to the engine case or a cowl, a rod coupled to the bracket via a bearing, a clevis coupled to the rod, a slider coupled to the clevis, a track coupled to the slider and to the engine case or the cowl, and a latch coupled to the track that is configured to control a translation of the slider along the track based on a state of the cowl. In some embodiments, the nacelle further comprises a locking mechanism coupled to the latch and configured to control the latch. In some embodiments, the latch is configured to control a translation of the slider along the track based on a degree to which the cowl is open.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for utilizing a hold open rod (HOR) in connection with an aircraft engine nacelle cowl. The HOR may be coupled (e.g., permanently mounted) to a first structure (e.g., a fan case or cowl) at a first end. At a second end of the HOR, the HOR may be associated with a clevis that couples to a slider. The slider may couple to a track. Nearing a fully opened position, the slider may push past a spring loaded mechanism, which then restricts motion back down the track thereby holding open a cowl. To close the cowl, the cowl may be lifted slightly to relieve the load off the locking mechanism. A solenoid or other device may then be activated that would pull back on the mechanism, allowing the slider to move down the track.

Figure 2A:
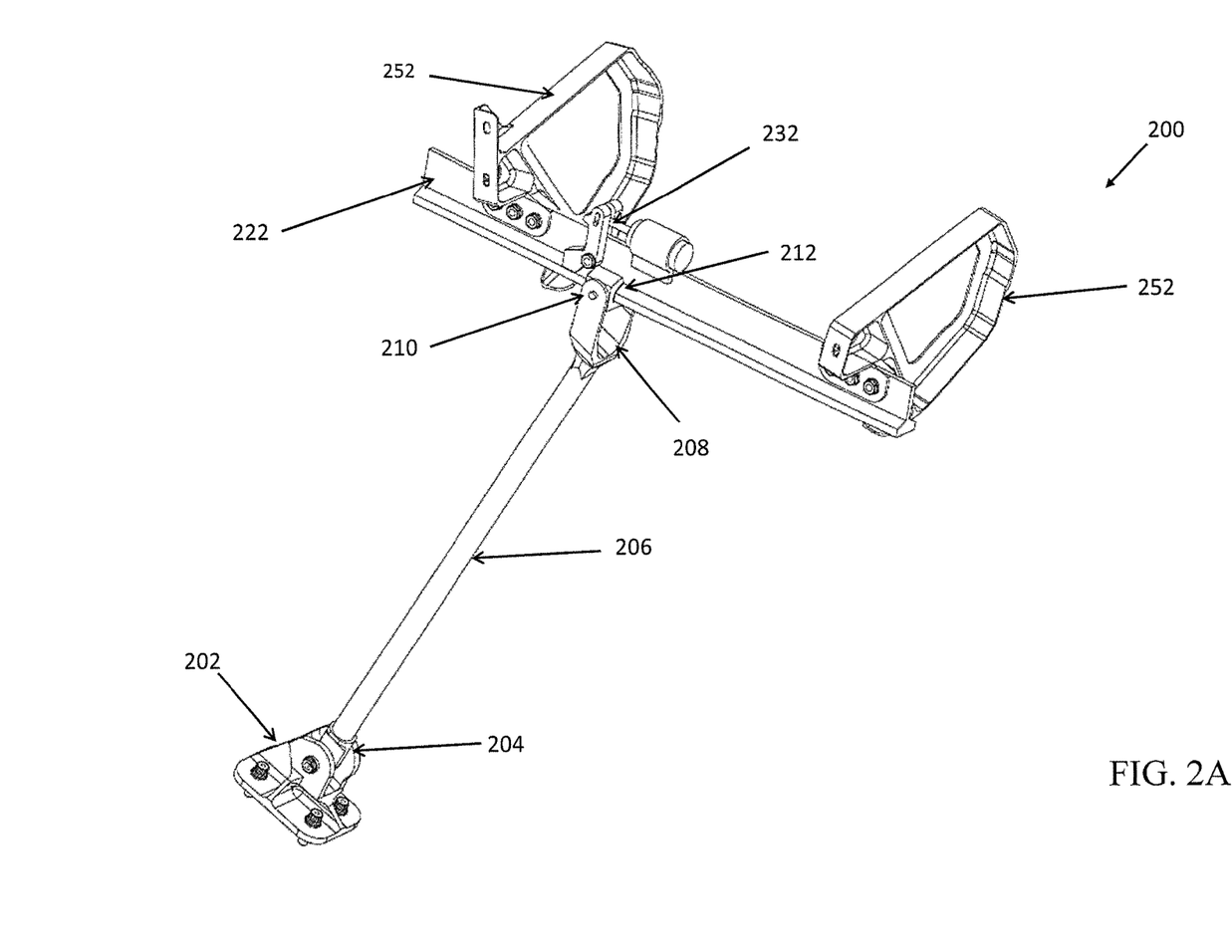
FIG. 2A illustrates a hold open rod system in accordance with aspects of this disclosure.

Referring now to FIG. 2A, a system 200 is shown. The system 200 may be implemented as a part of a nacelle of an aircraft. The system 200 includes a number of components and devices that are described in greater detail below.

The system 200 may include a bracket 202. The bracket 202 may couple to a structure of the nacelle, such as a fan case (e.g., fan case 110 of FIG. 1). The bracket 202 may be made of one or more materials, such as aluminum. The coupling may be facilitated using mounting or attachment hardware (e.g., nuts, bolts, washers, etc.) as would be appreciated by one of skill in the art.

The system 200 may include a bearing or bushings 204, a HOR 206, and a clevis 208. The bearing 204, which may include a spherical bearing, may enable the HOR 206 to rotate/pivot about the bracket 202 as the cowl is being opened or closed. The HOR 206 may be made of one or more materials, such as steel. While described as separate components/devices, two or more of the bearing 204, the HOR 206, and the clevis 208 may be formed as a common component/device.

Figure 2B:
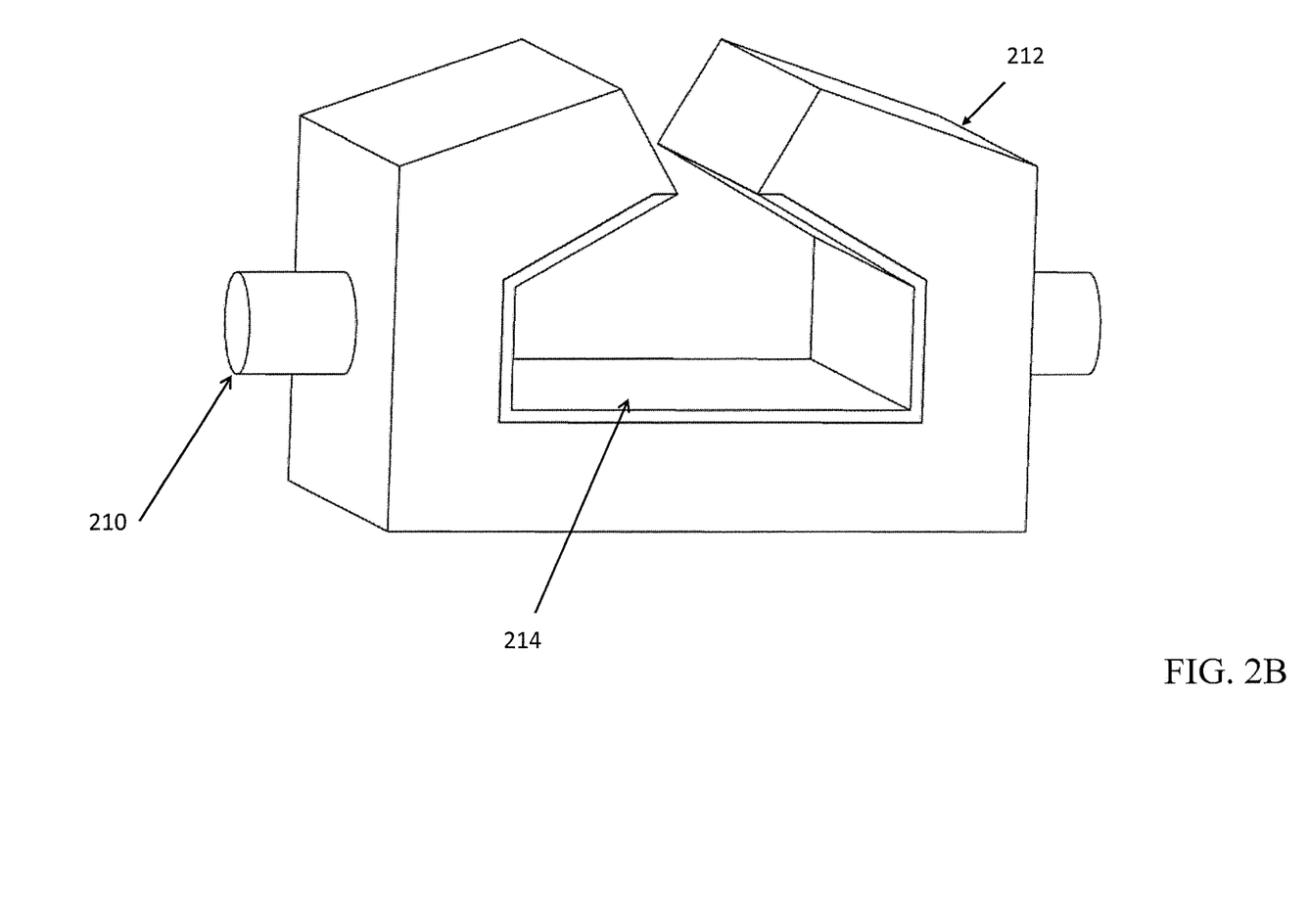
FIG. 2B illustrates a pin and a slider of the system of FIG. 2A.

The clevis 208 and an associated pin 210 may be used for coupling (e.g., attaching) the HOR 206 and a slider 212. Referring to FIG. 2B, a closer view of the pin 210 and the slider 212 is shown. The slider 212 may be made of one or more materials, such as steel. An interior portion 214 of the slider 212 may be made of a low-friction material, such as polytetrafluoroethylene (e.g., Teflon™). Referring to FIGS. 2A-2B, the interior portion 214 of the slider 212 may couple to or contact a track 222. The track 222 may be made of one or more materials, such as aluminum.

Figure 2C:
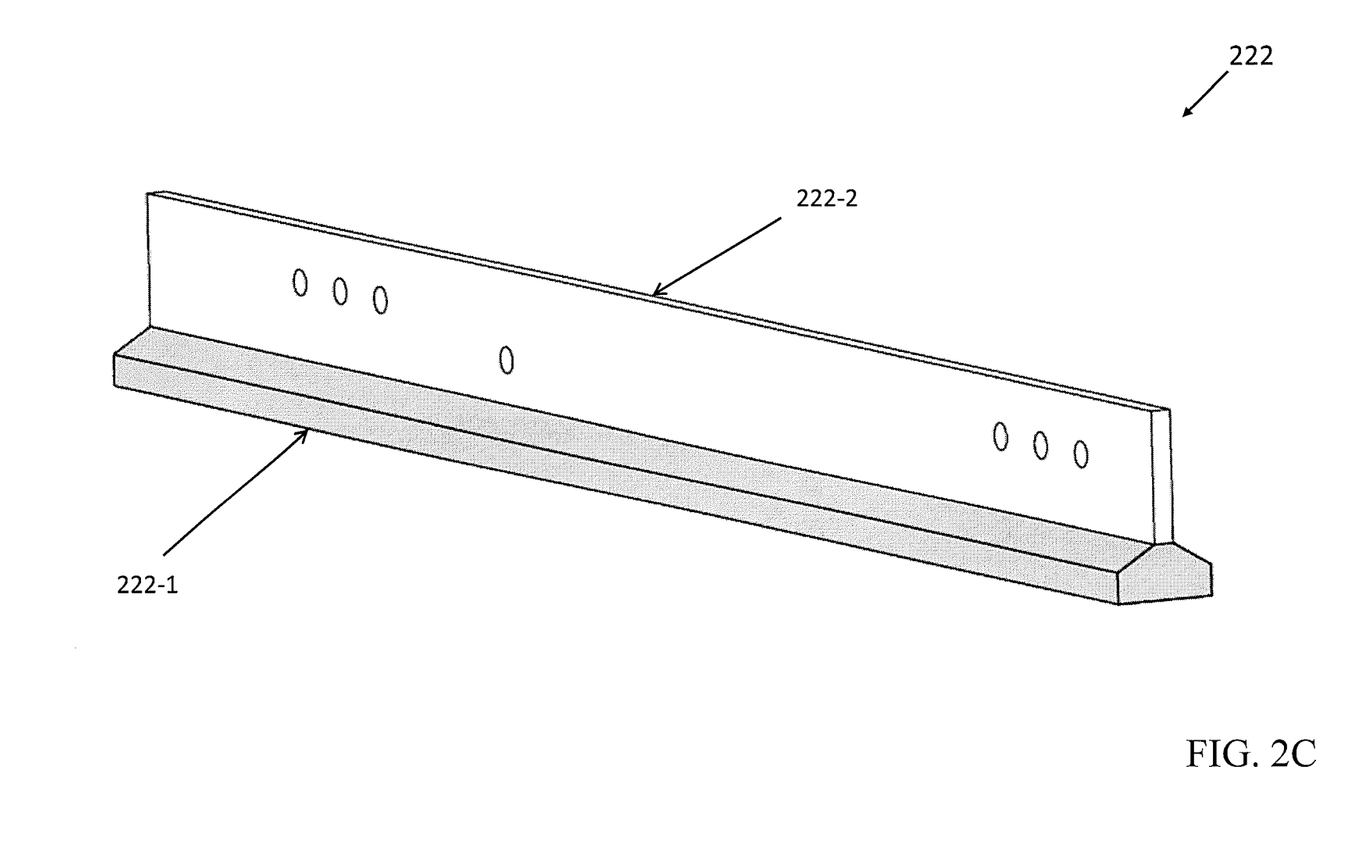
FIG. 2C illustrates a track of the system of FIG. 2A.

Referring to FIG. 2C, a closer view of the track 222 is shown. The track 222 and the slider 212 may be D-shaped, similar to a dovetail joint, or other common sliding joint shapes such as a ball joint. The track 222 may include a first section 222-1 that contacts the slider 212 (e.g., the interior portion 214). The first section 222-1 may be made of or treated with a low friction material. A second section 222-2 of the track 222 that is not subject to contact with the slider 212 may be made of the same or another material and surface treatment. The two sections 222-1 and 222-2 may compose a single component or be two separate components joined together.

Figure 2D:
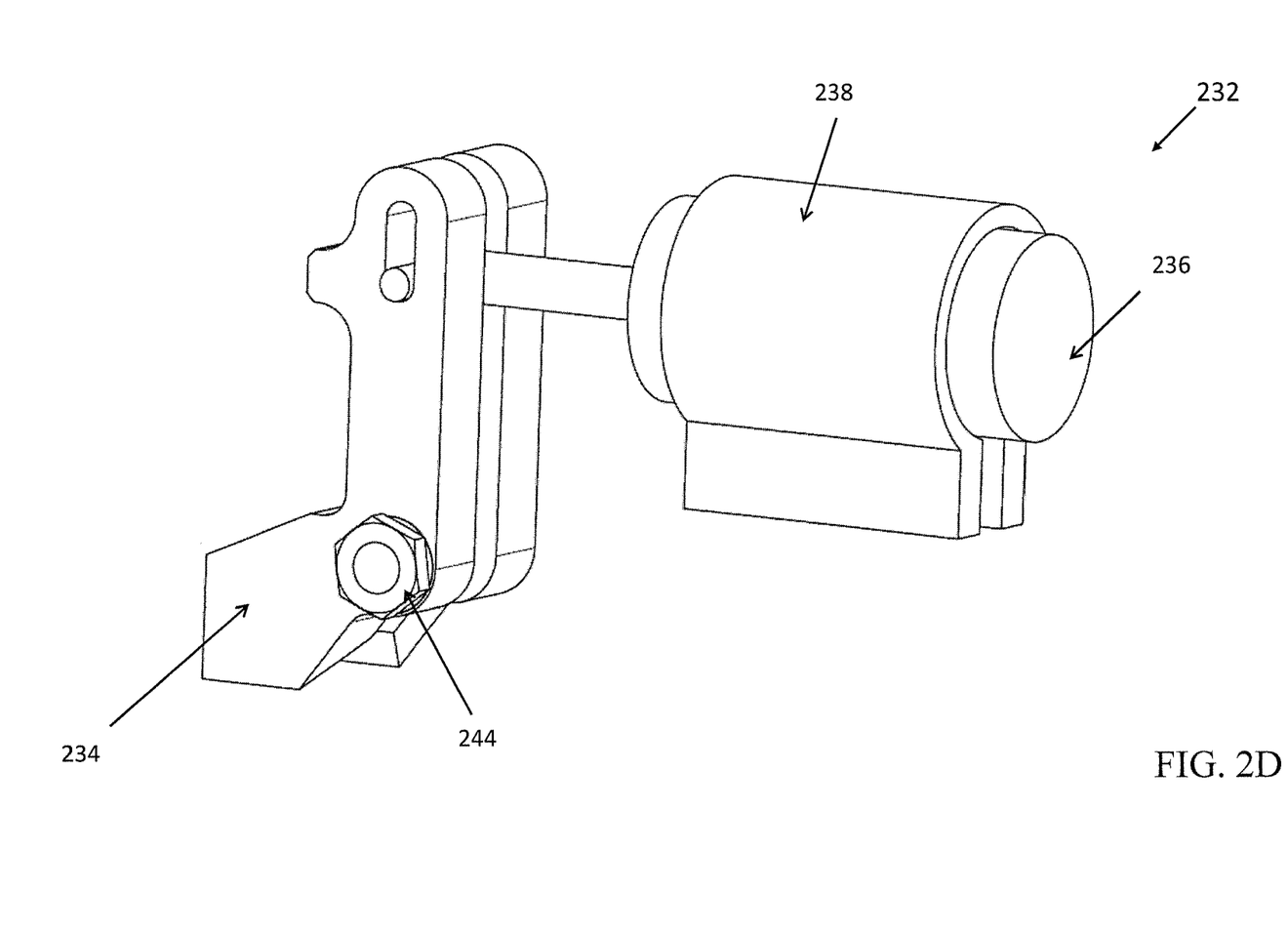
FIG. 2D illustrates a locking mechanism of the system of FIG. 2A.

Referring to FIGS. 2A and 2D, the system 200 may include a locking mechanism 232. The locking mechanism 232 may include a latch 234 coupled to a solenoid 236 (e.g., a spring loaded pulling solenoid) or other spring device. The solenoid 236 may be coupled (e.g., fixedly mounted) to the track 222, for example the second section 222-2. In some embodiments, the slider 212 may be locked by a spring loaded latch that is manually unlocked via a cable pull by a technician upon cowl closing. The slider 212 may be unlocked by an electronic servo motor turning a torsion spring. Also, it is possible the lock device is not spring loaded, rather designed such that it defaults to the locked position via inertial forces.

The latch 234 may be coupled (e.g., attached) to the track 222 at a location 244. The coupling at the location 244 may be facilitated using mounting or attachment hardware (e.g., nuts, bolts, washers, bushings, etc.) as would be appreciated by one of skill in the art. The location 244 may serve as an axis of rotation for the latch 234 with respect to the track 222.

Referring to FIG. 2A, the system 200 may include one or more brackets 252. The brackets 252 may be used to couple (e.g., mount or attach) the track 222 to a structure (e.g., the engine fan case 110 or a thrust reverser 102 of FIG. 1). The size or dimensions of the brackets 252, as well as the materials that are used for the brackets 252, may be selected based on structural loads that the brackets 252 may need to accommodate.

Figure 3A:
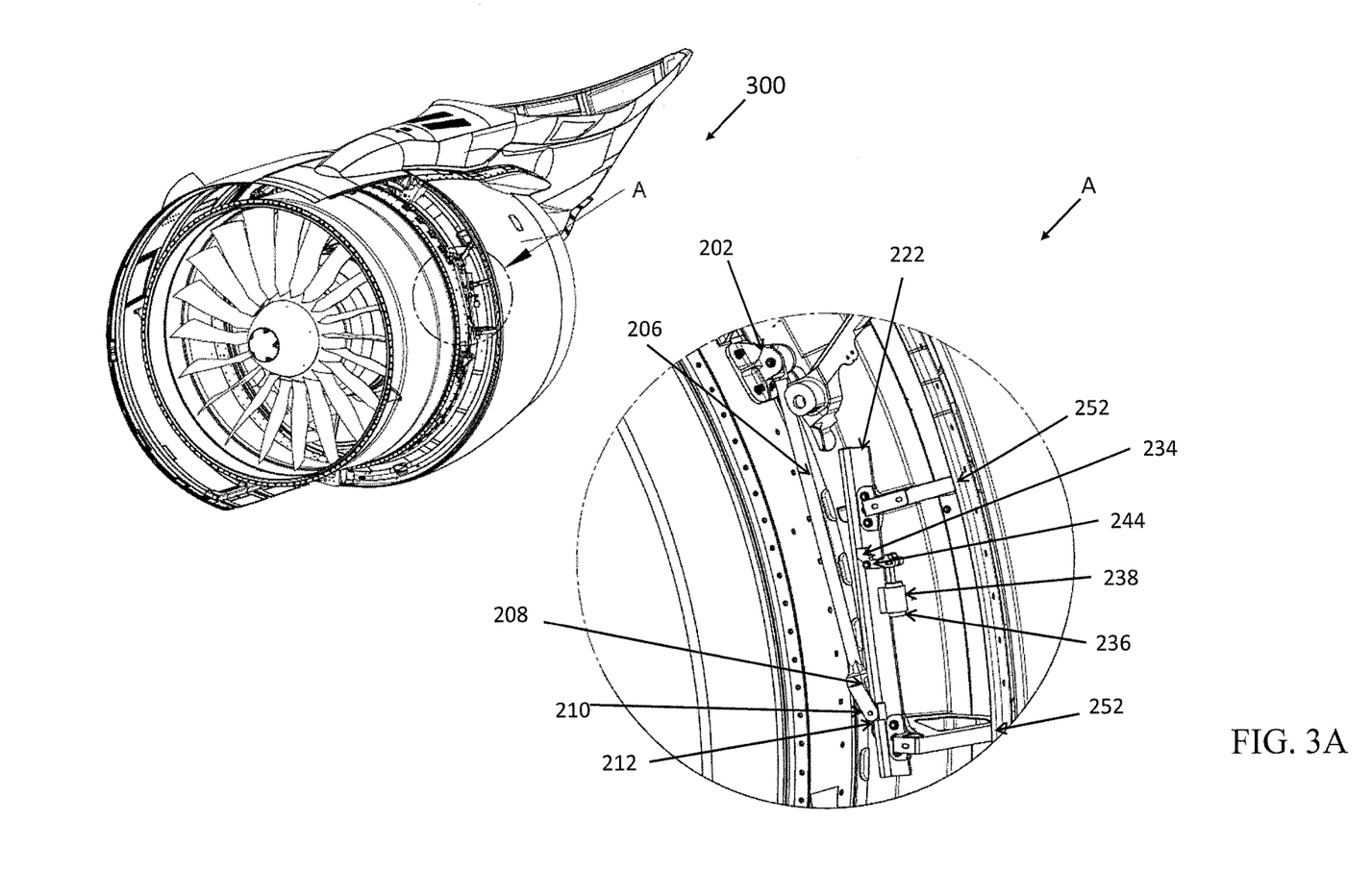
FIGS. 3A-3D illustrate the operation of the system of FIG. 2A at various stages of cowl opening or closing.
Figure 3B:
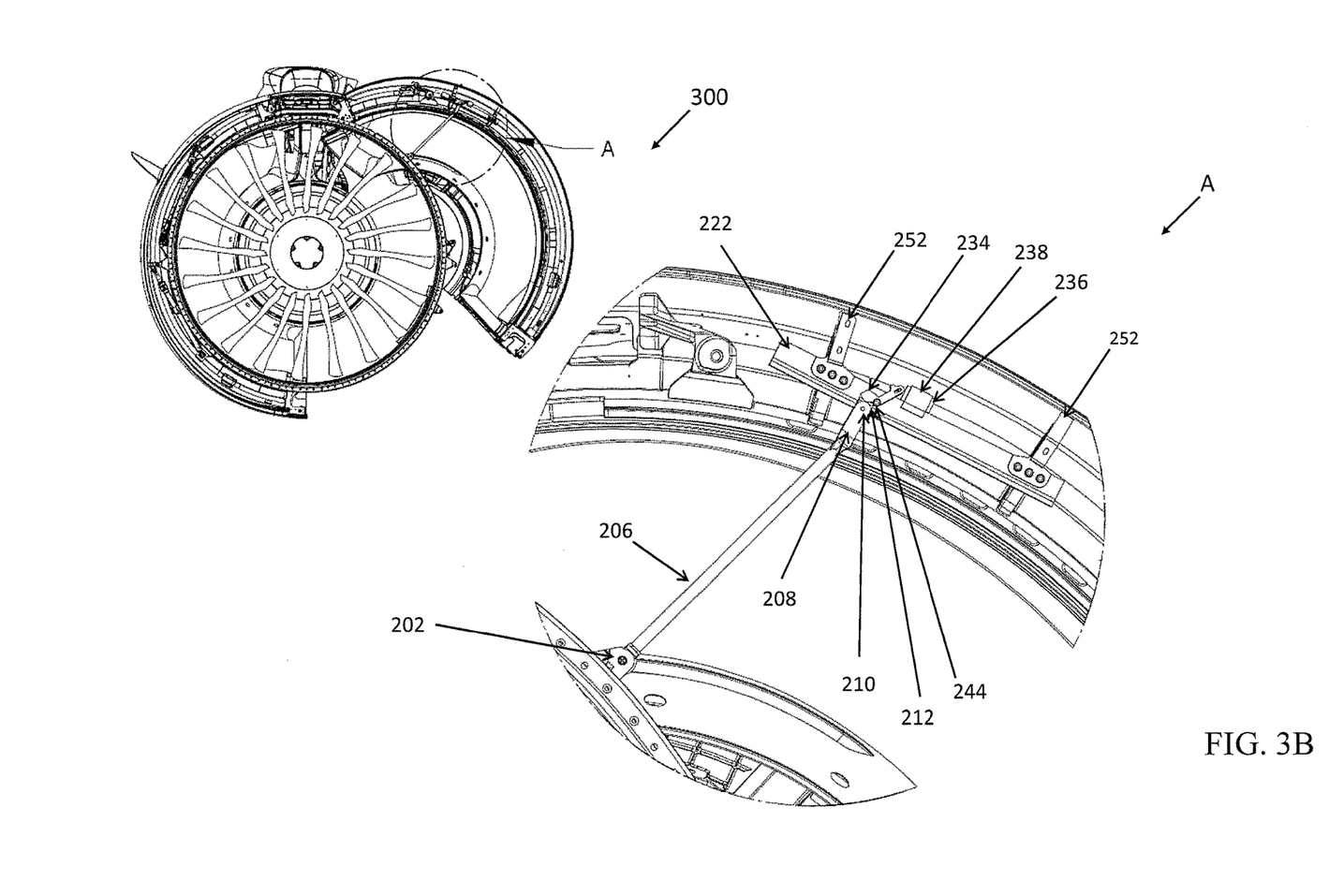

Referring to FIGS. 3A-3D, the operation of the system 200 is shown at various points/stages during an opening of a cowl of a nacelle 300 (where zoomed-in portions of the nacelle 300 are denoted via the letter 'A' as shown in each of the respective FIGS.). In FIG. 3A, the cowl is (substantially) closed. During the opening of the cowl, the HOR 206 rotates about the bracket 202 in a first direction (counter-clockwise in FIG. 3B), and the slider 212 is translated in a first longitudinal direction (up-and-to-the-left in FIG. 3B) along the track 222. Once the cowl has been opened by a first amount (e.g., approximately equal to the cowl's resting open position), the slider 212 contacts the latch 234, and the latch 234 rotates about the axis 244 in a first direction (clockwise in FIG. 3B).

Figure 3C:
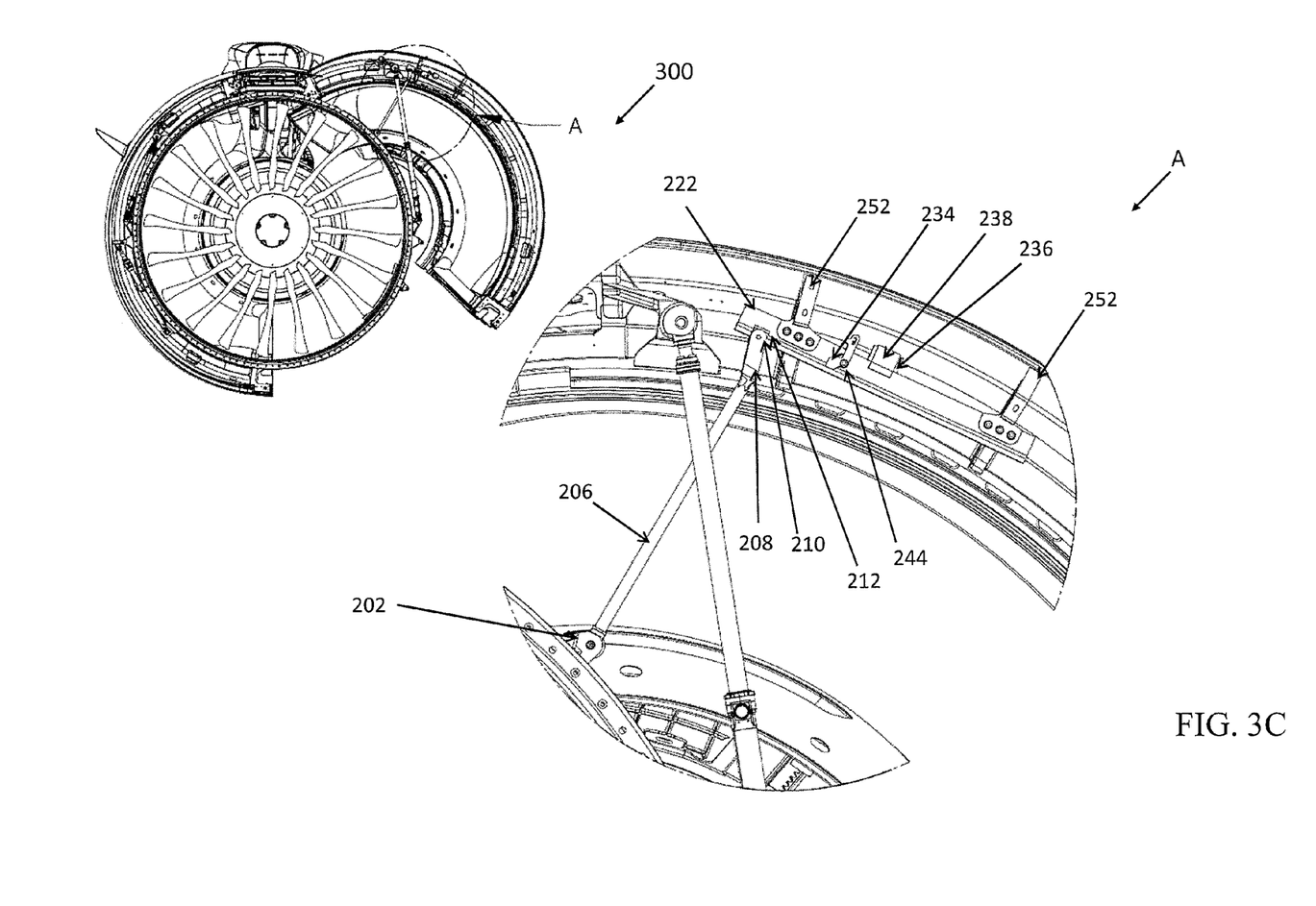

A technician will typically cause the cowl to open beyond this first amount, such that the cowl is open by a second amount (e.g., a couple of degrees beyond its resting open position). FIG. 3C illustrates such a scenario. As shown in FIG. 3C, the HOR 206 has been further rotated about the bracket 202 in the first direction and the slider 212 has been further translated in the first longitudinal direction along the track 222 relative to FIG. 3B, such that the slider 212 clears or no longer contacts the latch 234. Once the slider 212 clears the latch 234, the latch 234 may rotate about the axis 244 in a second direction (counterclockwise in FIG. 3C) that is opposite the first direction of rotation described above in connection with FIG. 3B. Such rotation may be brought about as a result of a force within the solenoid 236. For example, a spring associated with the mechanism 232 may cause the latch 234 to rotate in the second direction. Spring force or inertial forces may force the latch 234 to lock back onto the track 222 automatically. Magnetism may be employed for such a purpose.

Figure 3D:
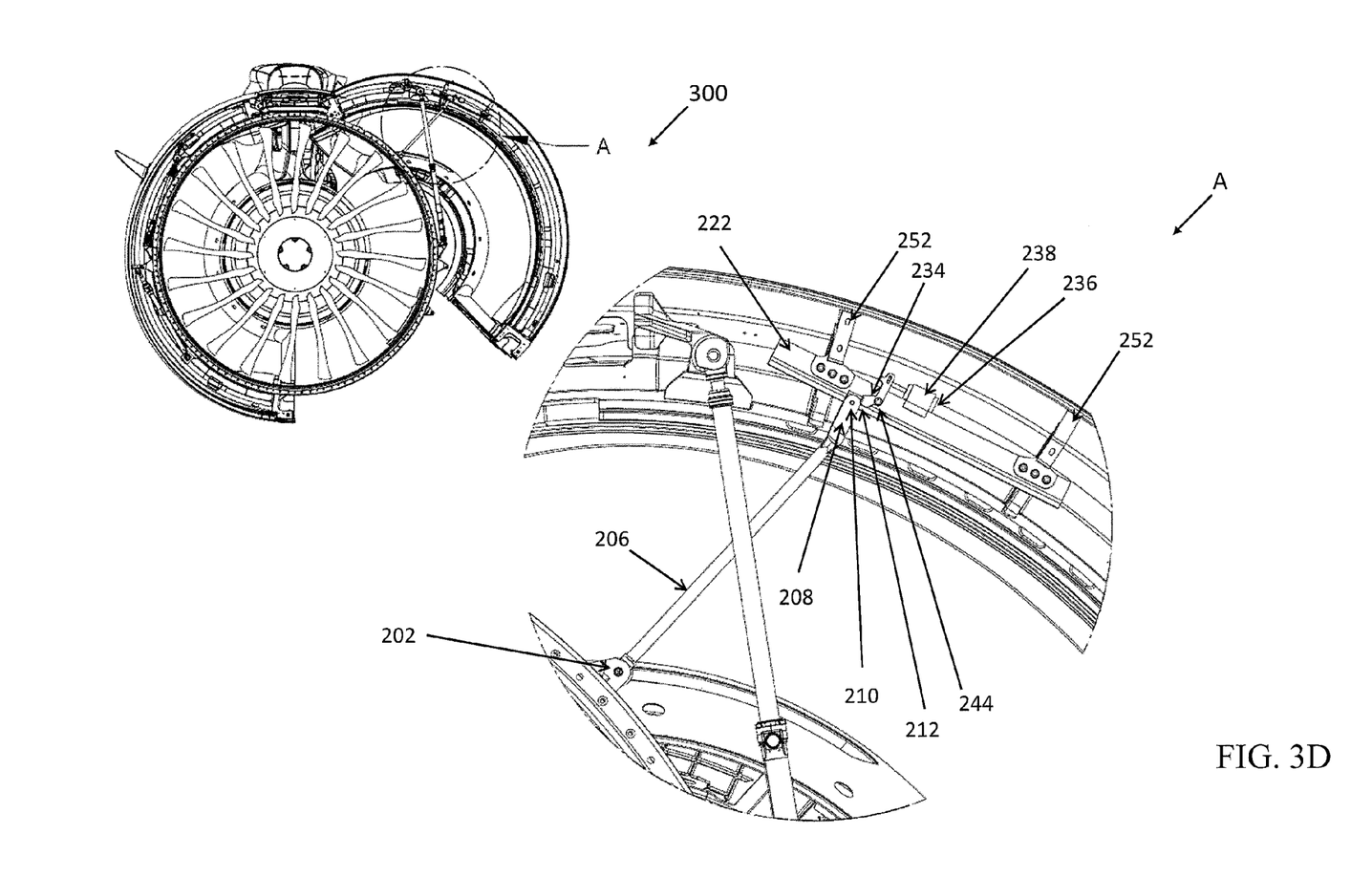

Once the cowl is open by this second amount, the cowl may be lowered to a resting open position in order to allow the technician to perform, e.g., a maintenance or inspection activity. FIG. 3D illustrates such a scenario, where the cowl is in the rest position. Relative to FIG. 3C, in FIG. 3D the HOR 206 has been rotated about the bracket 202 in a second direction (e.g., clockwise) and the slider 212 has been translated in a second longitudinal direction (e.g., down-and-to-the right) along the track 222. The movement of the HOR 206 and the slider 212 in transitioning from FIG. 3C to FIG. 3D may stop when the slider 212 abuts/contacts the latch 234.

In order to close the cowl following the maintenance or inspection activity, the steps described above in connection with FIGS. 3A-3D may be performed in reverse. For example, the load from the thrust reverser cowl imposed on the latch 234 may be removed by further opening the cowl (e.g., transitioning the cowl from being at a resting open position to a fully open position). Next, the solenoid 236 may be engaged, forcing the latch 234 to rotate in, e.g., the clockwise direction in FIGS. 3A-3D. This rotation of the latch 234 may create a path to enable the slider 212 to translate about the track 222 in the second longitudinal direction (e.g., down-and-to-the-right) until the cowl is (substantially) fully closed.

Figure 4A:
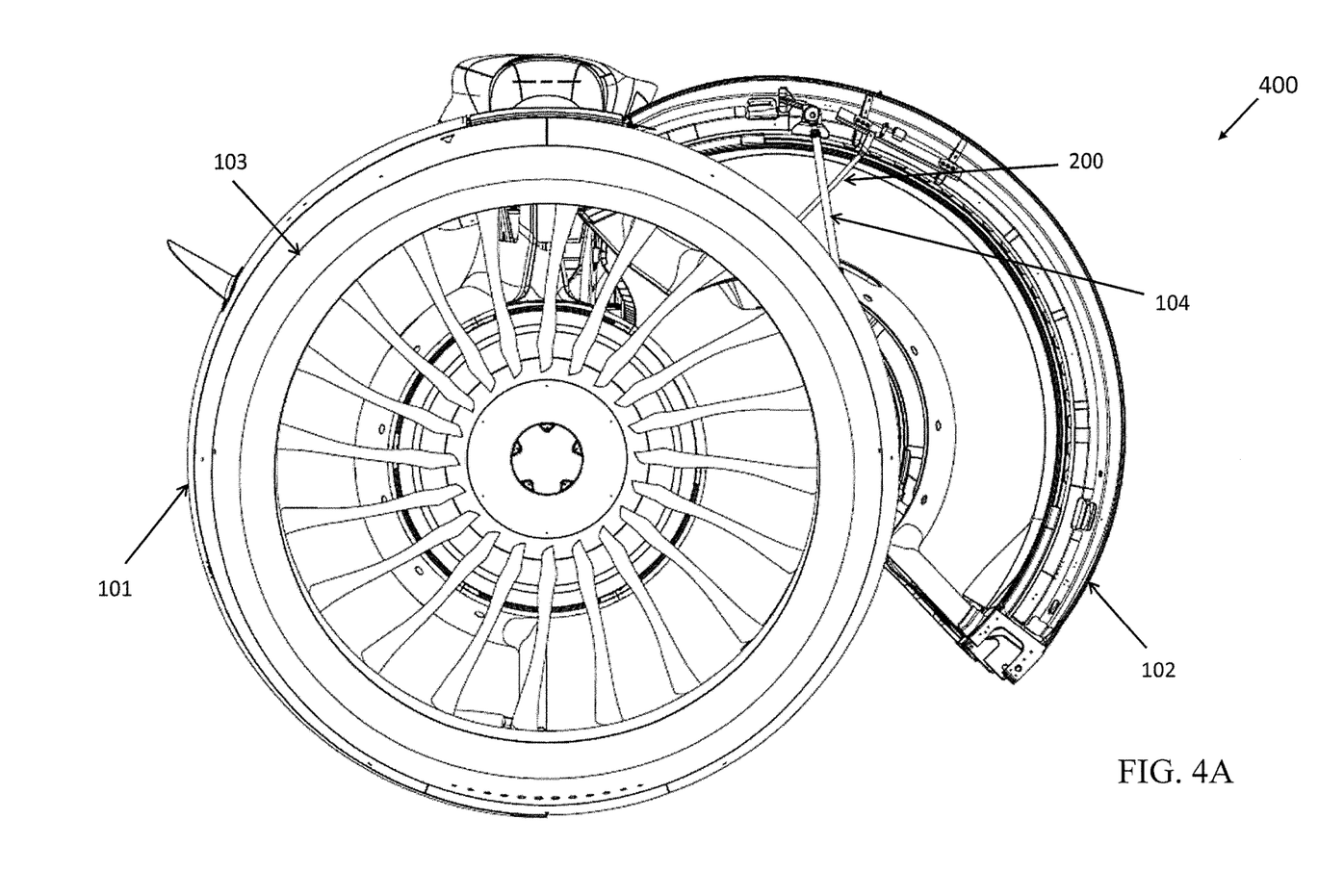
FIGS. 4A-4B illustrate a nacelle incorporating the system of FIG. 2A.
Figure 4B:
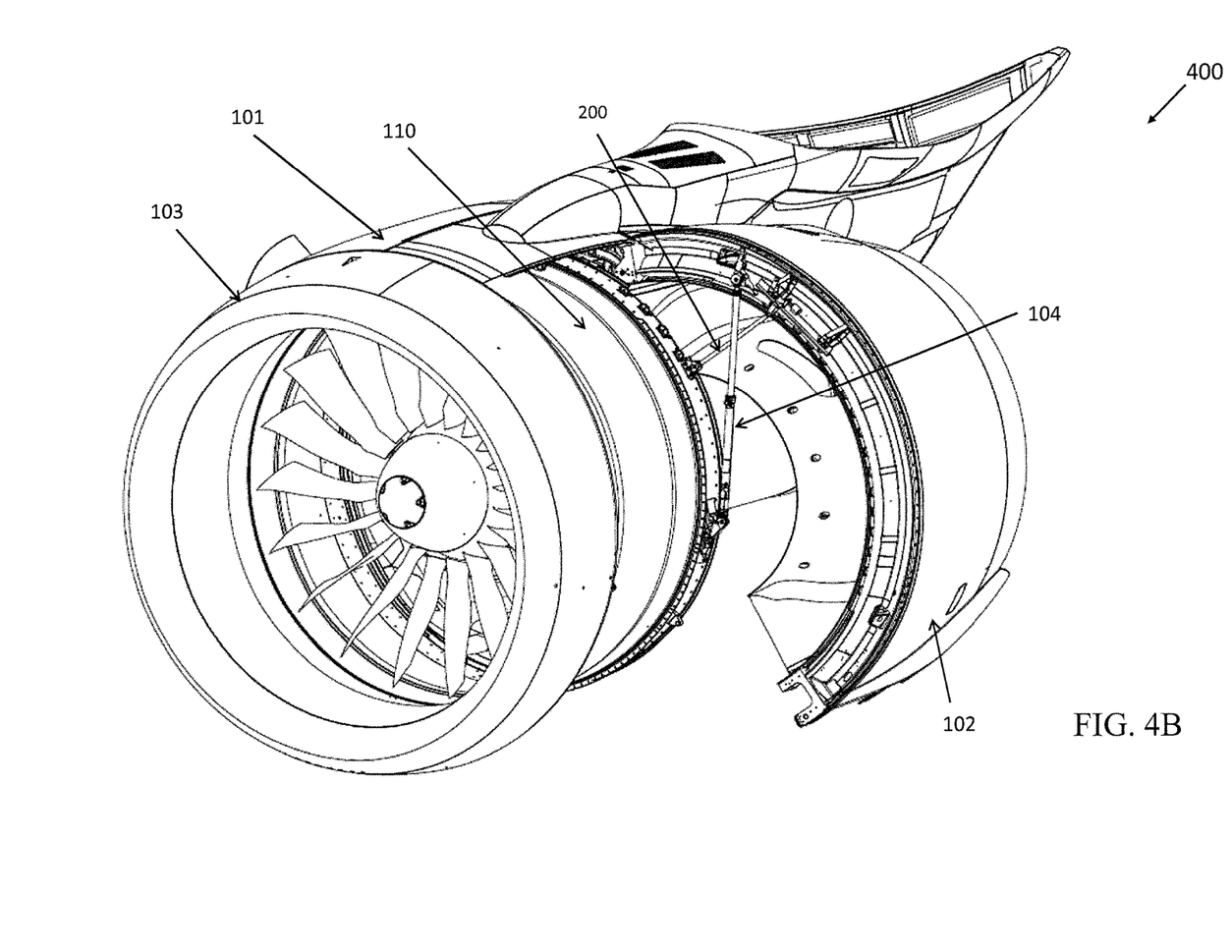

FIGS. 4A-4B illustrate a nacelle 400 (which may correspond to the nacelle 300 of FIGS. 3A-3D) that incorporates the system 200 of FIG. 2A. The thrust reverser 102 is shown in its resting open position held open by the system 200.

Technical effects and benefits of this disclosure include the provisioning of a locking mechanism that is self-deploying when a cowl is substantially in a fully opened position. Such a device may use at numerous steps along the track 222 to allow different locked open positions of the cowl. This would eliminate the possibility of a technician inadvertently forgetting to lock open the cowl during, e.g., a maintenance or inspection activity. A solenoid may be remotely operated (e.g. electronically or mechanically), thereby allowing the technician to be a clear distance from cowl which is opening or closing.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system configured to selectively hold open an aircraft engine cowl, comprising:
   a rod;
   a slider coupled to the rod;
   a track coupled to the slider,
   a latch coupled to the track; and
   a locking mechanism coupled to the latch and the track, wherein the locking mechanism is configured to cause the latch to rotate in a first direction about an axis as the slider translates along the track in a first longitudinal direction when the cowl is being opened, and wherein the locking mechanism is configured to cause the latch to rotate in a second direction about the axis that is opposite the first direction when the slider clears the latch as the slider translates along the track in the first longitudinal direction.

2. The system of claim 1, wherein the locking mechanism comprises a solenoid.

3. The system of claim 1, further comprising:
   a bracket coupled to a first end of the rod.

4. The system of claim 3, wherein the bracket is attached to an engine case or the cowl.

5. The system of claim 3, further comprising:
   a clevis coupled to a second end of the rod; and
   a pin coupled to the clevis and the slider.

6. The system of claim 1, wherein a portion of the slider that contacts the track is made of polytetrafluoroethylene, and wherein the track is made of aluminum.

7. The system of claim 1, wherein the track includes a first section that contacts the slider.

8. A nacelle system of an aircraft, comprising:
   an engine case;
   a bracket attached to the engine case or a cowl;
   a rod coupled to the bracket via a bearing;
   a clevis coupled to the rod;
   a slider coupled to the clevis;
   a track coupled to the slider and to the engine case or the cowl;
   a spring loaded latch coupled to the track that is configured to control a translation of the slider along the track based on a state of the cowl; and
   a locking mechanism coupled to the spring loaded latch and configured to control the spring loaded latch, wherein the locking mechanism is configured to cause the spring loaded latch to rotate in a first direction about an axis as the slider translates along the track in a first longitudinal direction when the cowl is being opened, and wherein the locking mechanism is configured to cause the spring loaded latch to rotate in a second direction about the axis that is opposite the first direction when the slider clears the spring loaded latch as the slider translates along the track in the first longitudinal direction.

9. The nacelle system of claim 8, wherein the spring loaded latch is configured to control a translation of the slider along the track based on a degree to which the cowl is open.

10. The nacelle system of claim 8, wherein the locking mechanism comprises a solenoid.

* * * * *